(12) United States Patent
Vankayala (10) Patent No.: US 12,469,823 B2
(45) Date of Patent: Nov. 11, 2025

(54) REPEATER SCHEME FOR INTER-DIE SIGNALS IN MULTI-DIE PACKAGE

(71) Applicant: Micron Technology, Inc., Boise, ID (US)

(72) Inventor: Vijayakrishna J. Vankayala, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 615 days.

(21) Appl. No.: 17/887,372

(22) Filed: Aug. 12, 2022

(65) Prior Publication Data

US 2023/0395566 A1     Dec. 7, 2023

Related U.S. Application Data

(60) Provisional application No. 63/348,384, filed on Jun. 2, 2022.

(51) Int. Cl.
| | |
|---|---|
| *G11C 7/10* | (2006.01) |
| *H01L 23/00* | (2006.01) |
| *H01L 25/00* | (2006.01) |
| *H01L 25/065* | (2023.01) |

(52) U.S. Cl.
CPC .......... *H01L 25/0657* (2013.01); *H01L 24/49* (2013.01); *H01L 25/50* (2013.01); *H01L 2224/49107* (2013.01); *H01L 2224/4911* (2013.01); *H01L 2224/49174* (2013.01); *H01L 2224/49421* (2013.01); *H01L 2924/1434* (2013.01)

(58) Field of Classification Search
CPC ..... H01L 25/0657; H01L 24/49; H01L 25/50; H01L 2224/49107; H01L 2224/4911; H01L 2224/49174; H01L 2224/494221; H01L 2924/1434
USPC ...................................................... 365/189.02
See application file for complete search history.

(56) References Cited

U.S. PATENT DOCUMENTS

| | | | |
|---|---|---|---|
| 7,796,446 B2 * | 9/2010 | Ruckerbauer | G11C 7/1048 365/189.05 |
| 7,875,985 B2 * | 1/2011 | Hiller | H01L 25/0657 257/E23.024 |
| 8,427,891 B2 * | 4/2013 | Best | G11C 11/005 365/185.08 |
| 8,514,634 B1 * | 8/2013 | Wu | G11C 11/419 365/189.04 |
| 8,610,258 B2 * | 12/2013 | Jones | G06F 13/385 257/777 |

(Continued)

*Primary Examiner* — Viet Q Nguyen
(74) *Attorney, Agent, or Firm* — Greenberg Traurig (57) ABSTRACT

Systems, methods, and devices related to techniques for repeating inter-die signals within a multi-die package of a memory device are disclosed. The multi-die package includes a memory stack including a first memory die handling interfacing with a host for the package and at least one second memory die coupled to and configured to communicate with the first memory die via an inter-die connection. A technique involves incorporating the use of a multiplexer positioned in front of the transmitter of each die to facilitate repetition of inter-die signals within the memory stack as needed depending on various factors associated with the memory stack, such as, but not limited to, the type of signal, the intended recipient of the inter-die signals, and the stack height of the memory stack.

24 Claims, 8 Drawing Sheets

(56) References Cited

U.S. PATENT DOCUMENTS

| | | | |
|---|---|---|---|
| 8,717,196 B2* | 5/2014 | Wang | B60R 1/27 |
| | | | 340/936 |
| 9,047,953 B2* | 6/2015 | Chen | H10B 43/20 |
| 9,106,229 B1* | 8/2015 | Hutton | H01L 25/105 |
| 9,164,147 B2* | 10/2015 | Chi | G01R 31/31717 |
| 9,406,401 B2* | 8/2016 | Lo | G11C 29/26 |
| 9,432,298 B1* | 8/2016 | Smith | H04L 49/9057 |
| 9,627,357 B2* | 4/2017 | Shoemaker | H01L 25/0657 |
| 9,871,020 B1* | 1/2018 | Ventrone | G11C 5/025 |
| 10,373,654 B1* | 8/2019 | Vankayala | H01L 25/0657 |
| 10,496,777 B1* | 12/2019 | Venkatakrishnan | G06F 30/39 |
| 10,607,691 B2* | 3/2020 | Best | H01L 23/481 |
| 11,036,660 B2* | 6/2021 | Ooi | G06F 30/34 |
| 11,366,772 B2* | 6/2022 | Vankayala | G06F 13/1668 |
| 11,705,432 B2* | 7/2023 | Fujisawa | G11C 5/04 |
| | | | 365/51 |
| 11,855,056 B1* | 12/2023 | Rad | H01L 25/18 |
| 11,868,174 B2* | 1/2024 | Gaide | H01L 25/0657 |
| 11,955,165 B2* | 4/2024 | Ware | G11C 29/824 |
| 11,961,823 B1* | 4/2024 | Jain | H01L 25/0657 |
| 11,972,121 B2* | 4/2024 | Vogelsang | G06F 3/0625 |
| 12,008,236 B2* | 6/2024 | Giduturi | G11C 5/02 |
| 12,009,043 B2* | 6/2024 | Kim | G11C 29/4401 |
| 2010/0060310 A1* | 3/2010 | Laisne | G11C 29/816 |
| | | | 326/16 |
| 2013/0272049 A1* | 10/2013 | Vogt | G11C 5/06 |
| | | | 257/774 |
| 2016/0048623 A1* | 2/2016 | Emirian | G06F 30/398 |
| | | | 716/105 |
| 2019/0333892 A1* | 10/2019 | Gaide | H01L 25/18 |
| 2023/0153587 A1* | 5/2023 | Vogelsang | G11C 5/025 |
| | | | 706/25 |

\* cited by examiner

REPEATER SCHEME FOR INTER-DIE SIGNALS IN MULTI-DIE PACKAGE

RELATED APPLICATIONS

The present application claims priority to Prov. U.S. Pat. App. Ser. No. 63/348,384 filed Jun. 2, 2022, the entire disclosures of which application are hereby incorporated herein by reference.

FIELD OF THE TECHNOLOGY

At least some embodiments disclosed herein relate to memory devices in general, and more particularly, but not limited to repeater schemes for repeating inter-die signals in multi-die packages of memory devices.

BACKGROUND

Generally, a computing system includes one or more processors and one or more memory devices, such as memory chips or integrated circuits. The memory devices may be utilized to store data that may be accessed, modified, deleted, and/or replaced. The memory devices may be, for example, non-volatile memory devices that retain data irrespective of whether the memory devices are powered on or off. Such non-volatile memories may include, but are not limited to, read-only memories, solid state drives, and NAND flash memories. Additionally, the memory devices may be volatile memory devices, such as, but not limited to, dynamic and/or static random-access memories, which retain stored data while powered on, but are susceptible to data loss when powered off.

In response to receiving an input, the one or more processors of the computing system may request that a memory device of the computing system retrieve stored data associated with or corresponding to the input. In certain situations, the data retrieved from the memory device may include instructions, which may be executed by the one or more processors to perform various operations and/or may include data that may be utilized as inputs for the various operations. In instances where the one or more processors perform operations based on instructions from the memory device, data resulting from the performance of the operations may be subsequently stored into the memory device for future retrieval, access, modification, and/or replacement.

Notably, the necessity of increasing memory density within computing systems has significantly increased as the amount of data to process, store, analyze, modify, and/or retrieve continues to exponentially increase. To increase memory density within a computing system, one technique has been to stack multiple memory die on top of one another inside a single package of a memory device to achieve multiple higher memory sizes. Notably, a favorable aspect of memory stacking is that memory stacking provides multiple higher memory sizes without substantially increasing the board space footprint that the memory and associated componentry occupies. One memory stacking technique involves utilizing a primary memory die to handle all the interfacing to an outside system (i.e., command, address, clock input, data I/O, and the like) and also to communicate with secondary memory die via internal signals transmitted within the package of the memory device.

Inter-die signals transmitted within the package of the memory device contact the transmitter, receiver, and electrostatic discharge (ESD) load on each die within the stack, and, as a result, as the stack height increases, the load associated with the inter-die signals increases. While increasing the transmitter size is an option to counteract the foregoing, doing so results in larger footprint usage on the board space, higher current consumption, larger propagation delays, and greater die-to-die variation. Furthermore, current inter-die signaling schemes result in significant capacitance issues on in-package buses, which limit high-speed signal transmission.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure describes various embodiments of systems, memory devices, and methods that may be utilized to facilitate the repetition of inter-die signals within a multi-die package of a memory device. As indicated herein, as the amount of data to be processed and stored by computing systems continues to increase over time, the ability to effectively increase memory density without consuming significant amounts of board space becomes increasingly necessary and important. A technique that has been utilized to increase memory density in current computing systems has been to stack multiple memory die on top of one another within a single package of a memory device. This stacking technique not only provides for multiple increases in memory sizes, but the technique is also able to accomplish the foregoing without significantly increasing the board space footprint that the memory occupies. A recent development in memory stacking involves utilizing one die in the stack as a primary die to handle all interfacing conducted with external systems and/or devices (i.e., command, address, clock input, data input/output, etc.) and to communicate with all other secondary die within the package via inter-die signaling. In such configurations, communications and/or signaling between the primary die and each of the secondary die are kept internal to the memory package of the memory device. Hosts, such as external hosts, that may seek to interact with the memory device do so by interfacing only with the primary die of the stacked memory. As a result, the host may not see or directly communicate with the secondary memory dies of the stacked memory and may only communicate with the primary die.

Typically, internal buses, paths, and/or inter-die lines between the primary die and the secondary dies are entirely internal to the memory package of the memory device and do not connect to external hosts, devices, and/or systems. In certain instances, inter-die lines utilized within the stacked memory of the memory device may be unidirectional or bidirectional. An example of a unidirectional line includes inter-die command and address lines, for which signals are transmitted from the primary die to be received by each of the secondary dies within the memory stack of the package. Another example of a unidirectional line includes lines utilized for transmitted data write signals. Such data write signals are unidirectional, however, the receivers are typically only active on the die that is/are being written to with the data write signals. Data read signals traversing data read lines may be driven by any die within a memory stack and may be ultimately received by the primary die. An example of a bidirectional line includes transmitting signals including read and write data on the same inter-die line of the stacked memory of the package of the memory device. In many instances, electrostatic discharge protection is also provided for every die on unidirectional and/or bidirectional lines utilized with memory devices. Electrostatic discharge protection may be utilized to prevent and/or reduce damage to portions of the memory device that may result from electrostatic discharges occurring within the stacked memory of the memory device. As the stack height of the memory stack increases and the clock frequencies increase, the transmitters on the dies typically need to be sized up, and, at a certain point, increase the drive capability for driving signals through the memory stack is not enough to meet performance goals for the memory device.

During operation of the memory device, the primary die of the memory stack may receive requests and/or signals from hosts, such as external systems, devices, and/or components. The requests may be to retrieve data, store data, modify data, access data, delete data, and/or perform any operation with respect to data. In response to receiving the requests and/or signals from the host(s), the primary die may generate inter-die signals that are transmitted by the primary die through each of the secondary dies of the stacked memory to effectively respond to the requests and/or signals received from the host(s). Notably, in current systems, these inter-die signals are not just sent to a single component of each secondary die, but, instead, are transmitted and/or propagated through every component on each die in the stacked memory. For example, each secondary die in the stacked memory may include componentry, such as transmitters, receivers, and electrostatic discharge components. The inter-die signals transmitted by the primary die will touch or propagate through to each of the transmitters, receivers, and electrostatic discharge components in each of the secondary die via inter-die connections established between the primary die and secondary die and also between secondary die and other secondary die within the stacked memory. Since the inter-die signals propagate and/or are transmitted to the transmitter, receiver, and electrostatic discharge componentry on each die in the stacked memory, these signals increase the signal load within the memory package. Increases in signal load may lead to increases in internal connection delays, clocking of signals, operational delays, power consumption, signal collisions, and response times (e.g., responding to a request from a host). This problem is exacerbated as the stack height of the memory package increases because the inter-die signals will necessarily traverse an increasing number of secondary dies, along with all of their componentry. An exemplary illustration of a stacked memory that provides a visual of how inter-die signals in current systems are transmitted within the stacked memory is shown on the left side of FIG. 6 and FIG. 7.

To counteract the foregoing issues relating to increases in signal load that affect a stacked memory, one option, as indicated above, is to increase the transmitter size, however, doing so results in a bigger layout area on the board, higher active current consumption, larger propagation delays, and greater die-to-die delay variation. Additionally, increasing the transmitter size results in an even higher load on the inter-die signals and eventually increasing transmitter sizes does not provide any further assistance in managing signal loads within the memory package of the memory device. For example, in current memory designs, a stacked memory height of 4H at 3200 MHz speed operation may be supported by increasing the size of the transmitter. However, as the stacked memory height is increased to 8H, 16H, and/or other heights, and/or clock speeds are increased to next generation speeds of 4800 MHz, 6400 MHz, or higher, increasing transmitter size will not work.

To address these and other technical problems associated with existing systems and devices, embodiments of the present disclosure provide for schemes for repeating inter-die signals on inter-die lines within a multi-die package of a memory device, which, in turn, will enable higher memory speed operation, reduce capacitance issues within the memory stack of the memory device, lower power consumption, smaller memory layout sizes, and smaller die-to-die and signal-to-signal delay variation. Memory packages may include various lines between and/or among the primary die and secondary dies that form the stacked memory of the packages of the memory devices. For example, inter-die command and address lines are one-directional/unidirectional. Signals associated with such lines are transmitted from the primary die and are received by every secondary die within the stacked memory. In such a scenario, while the transmitter of the primary die is always active, the transmitters of each of the secondary dies are unused or disabled. As another example, while data write lines are also unidirectional, the signals associated with such lines are transmitted from the primary die and are received specifically by the die to which data is being written to. Additionally, utilizing electrostatic discharge componentry on each of the die within the stacked memory may be unnecessary and may only serve to increase the signal load within the stacked memory.

For unidirectional command and address lines and/or data write lines, the present disclosure includes providing a technique for repeating command and address signals and/or data read signals within the middle of the memory stack of a multi-die memory device to assist in satisfying performance goals desired for the memory device. To facilitate repeating such types of signals within the memory stack, the present disclosure includes inserting a multiplexer component before the transmitter component on each die within the stack. For example, on a memory stack of 4H (i.e., there are four die in the memory stack, one of which is a primary die (die0) and the remaining die are secondary die (die1, die 2, and die3)), the multiplexers and transmitters on the primary die (e.g. die0) and the third die (e.g., die2) may be active. In certain embodiments, the multiplexer on the primary die may point to the internal signal and the multiplexer on the third die may point to the inter-die signal, which may be repeated and transmitted to the fourth die in the memory stack. Using the foregoing technique, the primary die may drive the first half of the path for the inter-die signal and the third die may drive the remaining path for the inter-die signal through to the end of the memory stack. Notably, the technique may be extended to be repeat the inter-die signal multiple times as needed, such as depending on the height of the stack and/or based on other factors, which may necessitate repetition of the signals (e.g. signal degradation occurring, signal propagation delays, etc.) In certain embodiments, each die within the memory stack may have die-level detect signal, which may be utilized to control one or more of the multiplexers and/or transmitters of each die.

For data read signals traversing on data read lines, the present disclosure provides a technique for repeating data read signals within the middle of the memory stack of the multi-die memory device to also assist in meeting performance goals established for the memory device. To facilitate repeating data read signals, the present disclosure inserts a multiplexor in front of the transmitter of each die in the memory stack. For example, on a memory stack of 4H, as described above, the multiplexors and transmitters on the fourth die, the second die, and the primary die (i.e., the first die in the stack) may be active. The multiplexer on the fourth die (e.g., a secondary die in this example) may point to the internal signal and the multiplexer on the second die (e.g., a secondary die in this example) may also point to the inter-die signal. The multiplexer on the second due may be utilized to repeat the inter-die signal so that the signal may be transmitted to the primary die receiver of the primary die (i.e., the first die in the stack). The signal may then be provided by the primary die to an external host that may have requested the memory device conduct the read operation for data to be read from the memory device. In certain embodiments, the technique for data read signals may also include utilizing control signals, which may be driven by the dies above the second die (e.g., die2 and die3 in this case), which may then be used by the second die (e.g., die1) to control the corresponding multiplexer and/or the transmitter when a data read is occurring from the third and/or fourth dies (e.g., die2 and/or die3). Based on the foregoing techniques provided by embodiments of the present disclosure, the present disclosure repeats inter-die signals within a stacked memory, reduces capacitance issues within the memory stack, and provides a variety of other benefits and enhancements.

Figure 1:
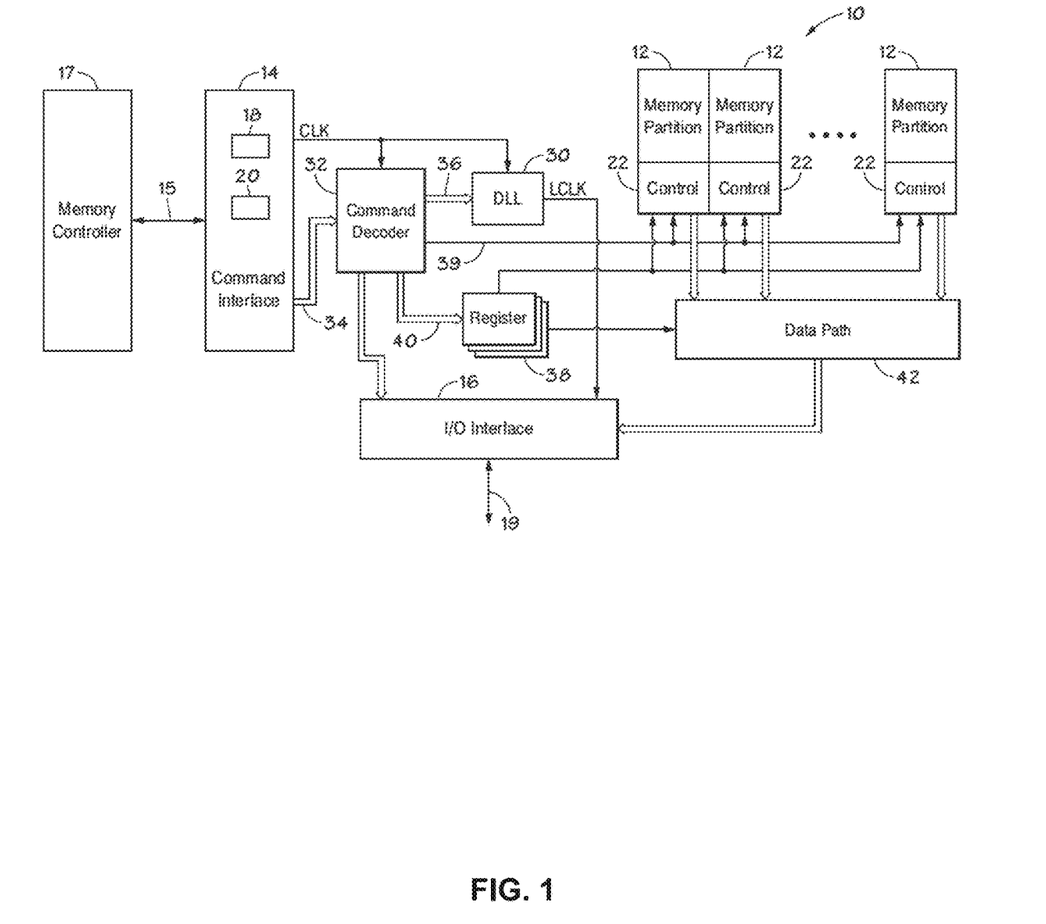
FIG. 1 illustrates a schematic diagram illustrating various features of a memory device according to an embodiment of the present disclosure.

To provide further detail relating to the advancements provided by the present disclosure and detail relating to the structure and functionality of the memory devices themselves, FIG. 1 illustrates a schematic diagram illustrating various features and functionality of a memory device 10 for use with embodiments of the present disclosure. In certain embodiments, the memory device 10 may be a random-access memory (RAM) device, a dynamic RAM (DRAM) device, a static RAM (SRAM) device (including other types of SRAM devices, such as a double data rate SRAM device), flash memory, and/or a phase change memory (PCM) device and/or other type of memory, such as self-selecting memories (SSM). Additionally, in certain embodiments, the memory cells of the memory device 10 may each include a corresponding logic storing device (e.g., a capacitor, a resistor, or the resistance of the chalcogenide material(s)).

In certain embodiments, the memory device 10 may include any number of memory partitions 12. Each of the memory partitions 12 may include one or more arrays (i.e., memory arrays). Various configurations, organizations, and sizes of the memory partitions 12 on the memory device 10 may be utilized depending on the application and design of the overall computing system that is desired. The memory device 10 may also include a command interface 14 and an input/output (I/O) interface 16. In certain embodiments, the command interface 14 may be configured to provide signals received from an external device or host, such as from a processor or controller (e.g., memory controller 17) external to the memory device 10. In some embodiments, a bus 15 (or a signal path or another group of signal paths) may allow for bidirectional transmission of signals between the command interface 14 and the processor or controller (e.g., the memory controller 17). Similarly, a bus 19 (or a signal path or another group of signal paths) may, individually or in combination, allow for bidirectional transmission of signals, including, for example, data signals, between the I/O interface 16 and, for example, the processor or controller (e.g., the memory controller 17). As a result, the processor and/or controller (e.g., the memory controller 17) may provide various signals to the memory device 10 to facilitate the transmission and receipt of data to be written to or read from the memory device 10.

In certain embodiments, the command interface 14 may include a plurality of circuits, such as, but not limited to, a clock input circuit 18 and a command address input circuit 20 to ensure proper handling and processing of the signals received by the memory device 10. The command interface 14 may receive one or more clock signals from an external device or host, such as a processor or controller (e.g., the memory controller 17). Similarly, the command interface may receive commands (e.g., read command, write command, other command, etc.), which may be entered on the positive edges of the clock signal, as well as data, which may be transmitted or received on both positive and negative clock edges of the clock signal. In certain embodiments, the commands may be of a variable clock length (e.g., one or more clocks may be used to receive the commands). In certain embodiments, the clock input circuit 18 may receive the one or more clock signals and generate an internal clock signal CLK from the one or more clock signals. In certain embodiments, the internal clock signal CLK may be supplied to an internal clock generator 30, such as a delay locked loop (DLL) circuit. The internal clock generator 30 may generate a phase controlled internal clock signal LCLK based on the received internal clock signal CLK. The phase controlled internal clock signal LCLK may be supplied to the I/O interface 16 and may be used as a timing signal for determining an output timing of read data.

In certain embodiments, the internal clock signal CLK may also be provided to various other components within the memory device 10 and may be utilized to generate various additional internal clock signals. For example, the internal clock signal CLK may be provided to a command decoder 32. The command decoder 32 may receive command signals from the command bus 34 and may decode the command signals to provide various internal commands. For example, the command decoder 32 may provide command signals to the internal clock generator 30 over the bus 36 to coordinate the generation of the phase-controlled internal clock signal LCLK. In certain embodiments, the phase-controlled internal clock signal LCLK may be used to clock data through the I/O interface 16. Additionally, the command decoder 32 may decode commands, such as read commands, write commands, register set commands, activate commands, and/or other commands, and may provide access to a memory partition 12 corresponding to the command, such as via bus path 39. The command decoder 32 may also transmit various signals to one or more registers 38 via, for example, bus path (e.g., one or more global wiring lines 40). In certain embodiments, the memory device 10 may include various other types of decoders, such as row decoders and column decoders, that may be utilized to facilitate access to the memory partitions 12. In certain embodiments, each memory partition 12 may include a control block 22 which may provide the necessary decoding (e.g., row decoder and column decoder), as well as other features, such as timing control and data control, to facilitate the execution of commands to and from the memory partitions 12.

In certain embodiments, the command decoder 32 or other component in the memory device 10 may provide register commands to the one or more registers 38, which may be utilized in operations of each memory partition 12, each control block 22 (or partition controller therein), and the like. For example, one of the one or more registers 38 may operate to define various modes of programmable operations and/or configurations of the memory device 10. Registers 38 may be included in semiconductor devices to define operations for various types of memory components, such as DRAM, synchronous DRAM, chalcogenide memories (e.g., PCM) or other types of memories. The one or more registers 38 may receive various signals from the command decoder 32 (or other similar components) via global wiring lines 40. The global wiring lines 40 may include a common data path, a common address path, a common write command signal path, and a common read command signal path. The global wiring lines 40 may traverse across the memory device 10, such that each register 38 may couple to the global wiring lines 40. The additional registers may involve additional wiring across the semiconductor device (e.g., die), such that the registers are communicatively coupled to the corresponding memory components.

In certain embodiments, the one or more registers 38 may operate as an example of registers that, when in operation, are accessed or otherwise accessible by the memory controller 17. The registers accessible by the memory controller 17 may be dispersed across the memory device 10 and the registers may represent or contain information such as configuration settings of the memory device 10 and/or specific components therein, status of the memory device 10 and/or specific components therein, memory device 10 parameters and/or specific parameters for components of the memory device 10, as well as predetermined patterns that can be written across the memory device (e.g., in one or more of the memory partitions 12). While the registers 38 are illustrated in FIG. 1, additional and/or alternative registers may be located in the memory device and such registers may be accessible by the memory controller 17 (i.e., when in operation, the registers may be accessed by the memory controller 17). In certain embodiments, the accesses by the memory controller 17 may include, for example, reads of the registers (e.g., read accesses) and/or writes to the registers (e.g., write accesses).

In certain embodiments, the memory device 10 may execute operations, such as read commands and write commands, based on the command and/or address signals received from an external device/host, such as a processor and/or by the memory controller 17. In certain embodiments, command/address signals may be clocked to the command interface 14 using clock signals. The command interface may include a command address input circuit 20 which may be configured to receive and transmit the commands to provide access to the memory partitions 12, through the command decoder 32. Additionally, the command interface 14 may receive memory select signals that enable the memory device 10 to process commands on the incoming command/address signals. In certain embodiments, access to specific memory partitions 12 within the memory device 10 may be encoded in the commands. Furthermore, the command interface 14 may be configured to receive a plurality of other command signals. For instance, a reset command may be used to reset the command interface 14, status registers, state machines and the like, during power-up for instance. Various signals to facilitate testing of the memory device 10 may be provided, as well. For example, the testing signals may be used to place the memory device 10 into a test mode for connectivity testing. The command interface 14 may also be used to provide an alert signal or another alarm signal to the system processor or controller for certain errors that may be detected. However, in certain embodiments, the I/O interface 16 may be utilized to transmit an alert signal, such as a thermal alert.

Data may be sent to and from the memory device 10, utilizing the command and clocking signals discussed above, by transmitting and receiving data signals through the I/O interface 16. Indeed, the data may be sent to or retrieved from the memory partitions 12 over the data path 42, which may include a plurality of bi-directional data buses. Data I/O signals may generally be transmitted and received in one or more bi-directional data busses to and from the I/O interface 16. For certain memory devices, such as a DDR5 SDRAM memory device, the I/O signals may be divided into upper and lower bytes, however, such segmentation may not be required for other types of memory devices. Notably, various other types of components, such as power supply circuits (for receiving external VDD and VSS signals), read/write amplifiers (to amplify signals during read/write operations), temperature sensors (for sensing temperatures of the memory device 10), and/or other components, may also be incorporated into the memory device 10. Accordingly, the specific configuration of the components schematic diagram of FIG. 1 is only provided to highlight certain functional features of the memory device 10 of the present disclosure.

Figure 2:
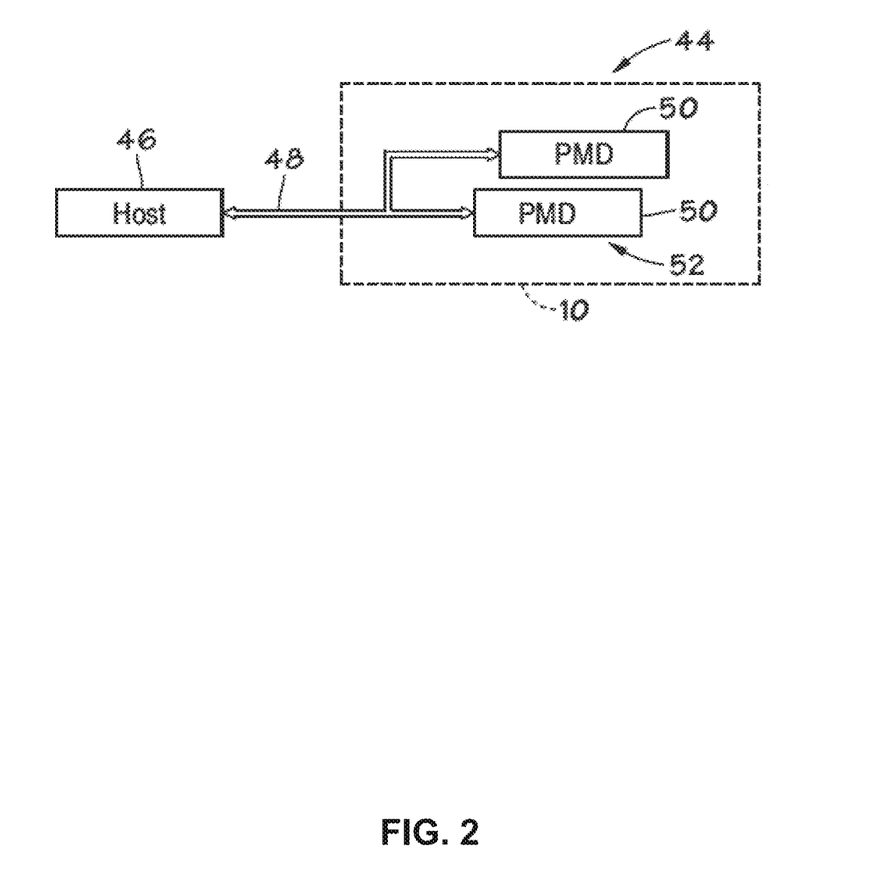
FIG. 2 illustrates a schematic diagram illustrating an exemplary memory stack for use with the memory device of FIG. 1 according to an embodiment of the present disclosure.

Referring now also to FIG. 2, FIG. 2 illustrates a diagram 44 depicting stacking of memory in the memory device 10. As illustrated, a host device 46 (i.e., memory controller 17, a CPU in the host device, or other device or component) may transmit commands and/or data to the memory device 10 via a front-end interface path 48, which may be one or more of the bus 15 and the bus 19 described in the description for FIG. 1. The front-end interface path 48 may operate as a command and/or data input output pathway (e.g., a bus or a signal path or another group of signal paths). Furthermore, as illustrated in FIG. 2, each memory die 50 may be stacked into a memory stack 52 (e.g., a 3D memory stack) so that multiple memory dies 50 may be present in the memory device 10 with a reduced board space footprint on the package of the memory device 10.

Figure 3:
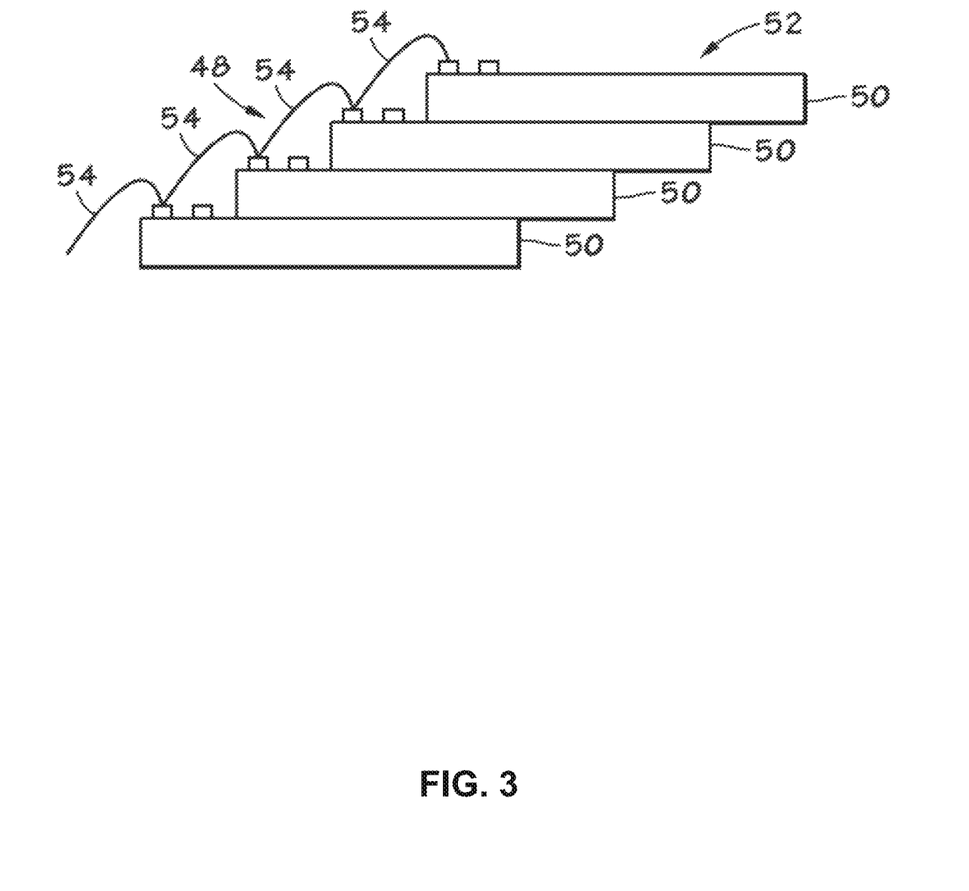
FIG. 3 illustrates a schematic diagram illustrating an exemplary configuration for the memory stack of FIG. 2 according to an embodiment of the present disclosure.

Referring now also to FIG. 3, FIG. 3 illustrates an exemplary memory stack 52 in which the front-end interface path may be coupled to each of the memory dies 50. One or more connections (e.g., bond wires 54, TSVs, or the like) may be utilized to extend the front-end interface path to each of the memory dies 50. As illustrated in FIG. 3, this may form a cascade connection, however, it is noted that one or more direct connections for each bond wire 54 can instead be coupled to a substrate, whereby the bond wires 54 are not directly coupled to other memory dies 50 in the memory stack 52. Similarly, a combination of the two wiring techniques may be employed in connecting the memory dies 50 of the memory stack 52 to the front-end interface path 48. In the configurations illustrated in FIG. 2 and FIG. 3, the input command/control/address (as well as the data pins) of the memory device 10 may be shared across the memory dies 50 of the memory stack 52. However, such a configuration may operate to reduce the net interface speed capability of the memory device 10 as a function of the height of the memory stack 52 (e.g., the number of memory dies 50 in the stack utilizing the shared front-end interface path 48 with each memory die 50 operating as a primary die).

Figure 4:
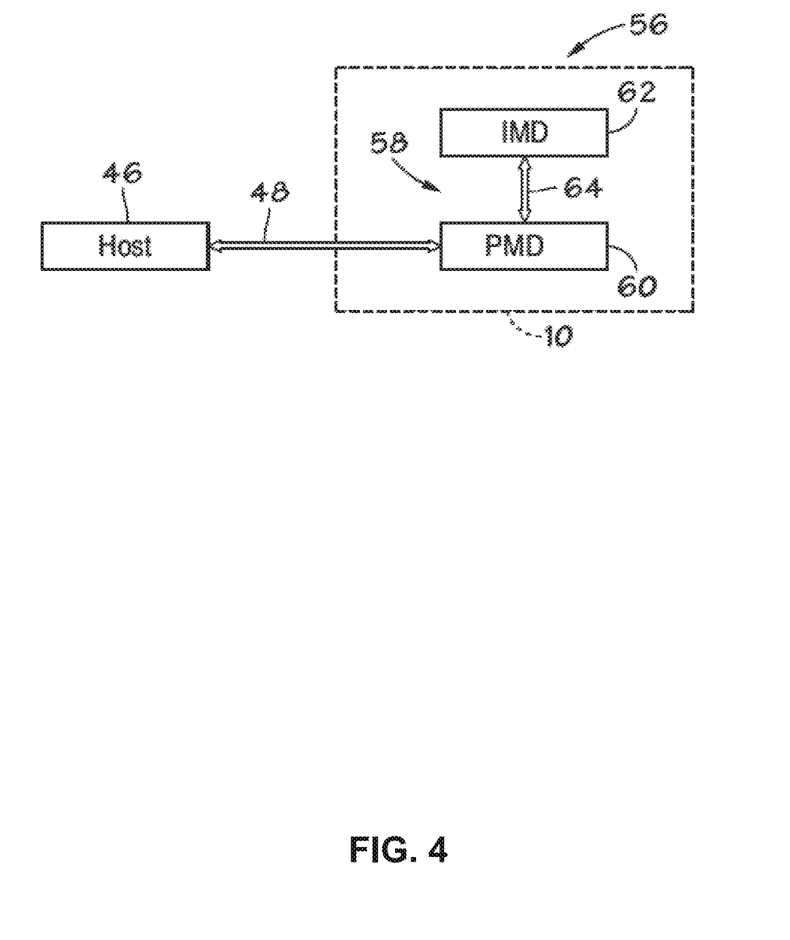
FIG. 4 illustrates a schematic diagram illustrating another exemplary memory stack for use with the memory device of FIG. 1 according to an embodiment of the present disclosure.

Referring now also to FIG. 4, FIG. 4 illustrates a schematic diagram 56 of a second method of conducting memory stacking in the memory device 10. In certain embodiments, the host device 46 (i.e., memory controller 17, a CPU in the host device, and/or other device or component) may transmit commands and/or data to the memory device 10 via the front-end interface path 48, which may be one or more of the bus 15 and the bus 19. Furthermore, as illustrated in FIG. 4, a memory stack 58 may include a primary memory die 60 (similar to memory die 50), as well as one or more secondary memory dies 62 (i.e., internal memory dies (IMD)) stacked on top of the primary memory die 60. Additionally, as illustrated in FIG. 4, the front-end interface path 48 may be connected to the primary memory die 60 and a second path and/or path array (e.g., a back-end interference path 64) may be coupled between the primary memory die 60 and the one or more secondary memory dies 62. This configuration is further illustrated in FIG. 5 of the present disclosure.

Figure 5:
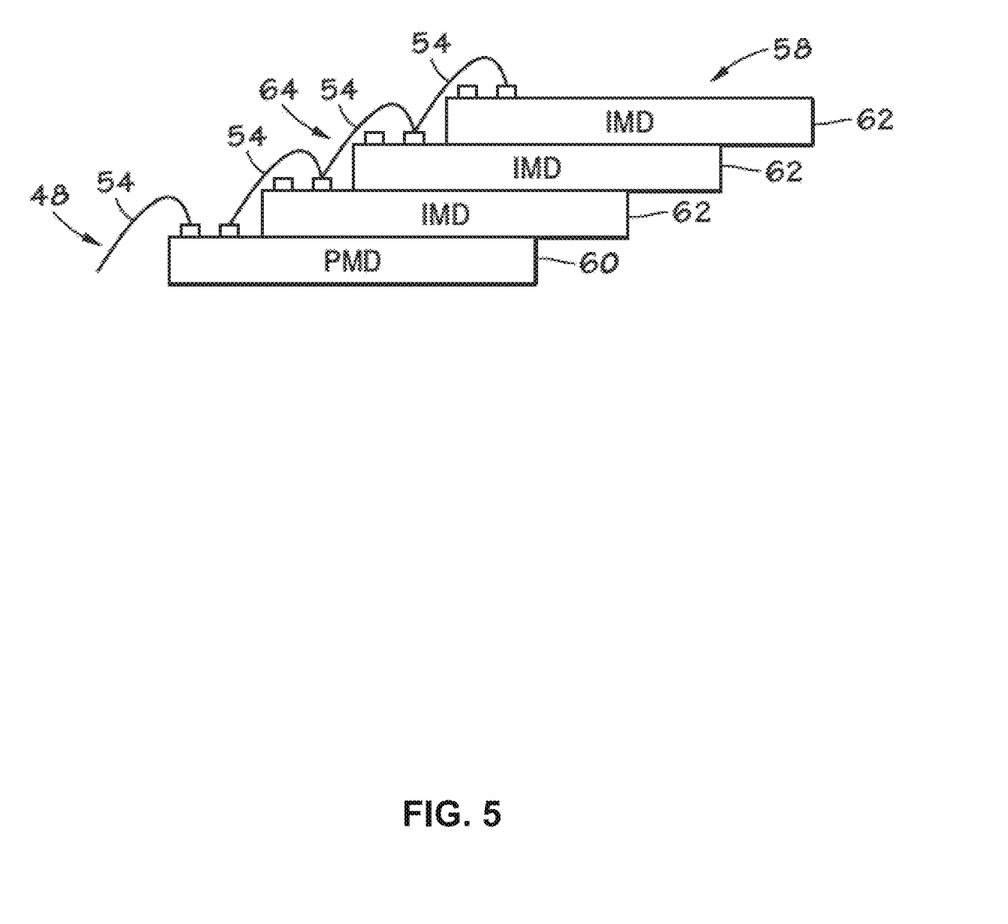
FIG. 5 illustrates a schematic diagram illustrating an exemplary configuration for the memory stack of FIG. 4 according to an embodiment of the present disclosure.

Referring now also to FIG. 5, FIG. 5 illustrates the memory stack 58 including the primary memory die 60 and secondary memory dies 62 stacked on top of the primary memory die 60. While the memory stack 58 is illustrated as including a primary memory die 60 and three secondary memory dies 62 stacked thereon, the primary memory die 60 can be placed in a different location in the memory stack 58. Similarly, a greater or fewer quantity of secondary memory dies 62 may be utilized in the memory stack 58. For example, 1, 2, 3, 7, 11, 15 or any other number of secondary memory dies 62 in addition to the primary memory die 60 of the memory stack 58 may be incorporated into the memory stack 58. In some embodiments, the primary memory die and the secondary memory die 62 may be part of the same or different silicon.

As shown in FIG. 5, the primary memory die 60 may be directly coupled to the front-end interference path 48 via bond wires 54 (or other connection paths). In contrast, the secondary memory dies 62 may be coupled to the front-end interference path 48 via the primary memory die 60. For example, a bond wire 54 may be directly coupled from a first stacked secondary memory die 62 to the primary memory die 60, a second bond wire 54 may be directly coupled from the first stacked secondary memory die 62 to a secondary stacked memory die 62, and so forth for each additional secondary memory die 62 included in the memory stack 58. Based on the foregoing configuration, each secondary memory dies 62 may receive signals (e.g., command, control, and/or address and/or data signals) from the host device 46 indirectly because direct communications between the memory stack 58 and the host device 46 may be performed by the primary memory die 60. Because the host device 46 is only directly coupled to the primary memory die 60 of the memory stack 58, capacitance due to the secondary memory dies 62 of the memory stack 58 is isolated from the host device 46 and the front end interface path 48. This may result in increased signal rates (e.g., data rates) along the front-end interface path 48 relative to the configuration of the memory device illustrated in FIG. 2.

Various types of situations may occur with regard to the memory stack 58. For example, the internal path delay between the primary memory die 60 and the secondary memory die 62 disposed farthest (e.g., by distance) from the primary memory die 60 (i.e., the secondary memory die 62 at the top of the memory stack 58) can affect signal transmissions relative to a clock period of the clock utilized in conjunction with the front-end interface path 48. Similarly, in certain cases, different dies may be used in manufacturing one or more of the primary memory die 60 and the one or more secondary memory dies 62 in the memory, which can lead to differences in, for example, complementary metal-oxide-semiconductor (CMOS) processes of the memory dies 60 and 62 in the memory stack 58. As a result, positional differences and/or other factors of the memory dies 60 and 62 in the memory stack 58 may result in differences in delays between one or more of the memory dies 60 and 62 of the memory stack 58 as well as, for example, signal collisions along the back end interference path 64.

Figure 6:
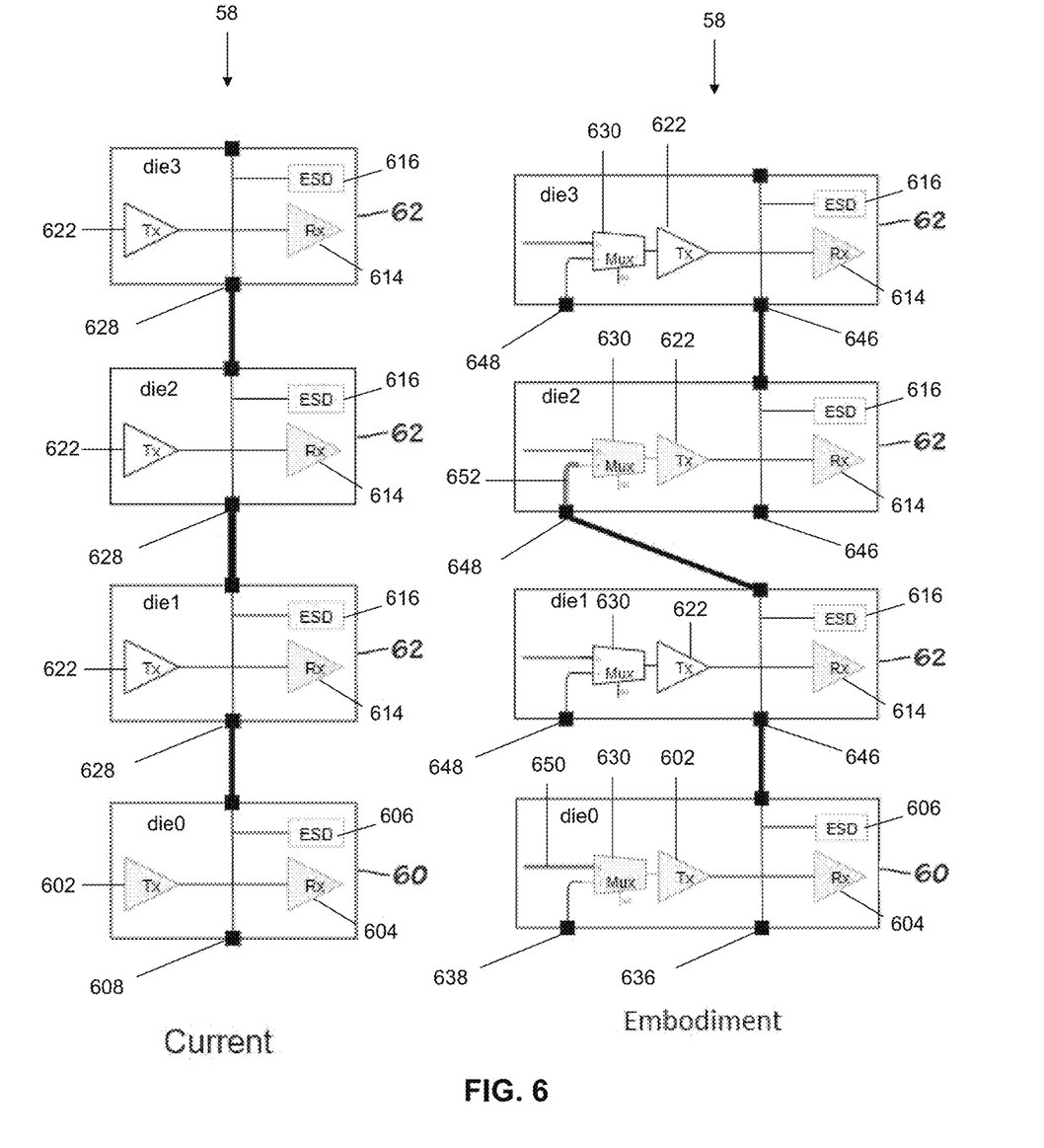
FIG. 6 illustrates a pair of schematic diagrams illustrating a current configuration of a memory stack for use with a multi-die package and a configuration for a memory stack for facilitating repetition of inter-die signals from a primary memory die to secondary memory dies within a multi-die package according to embodiments of the present disclosure.

Referring now also to FIG. 6, FIG. 6 illustrates schematic diagrams illustrating an existing configuration of a memory stack (e.g. memory stack 58) for use with a multi-die package and a first embodiment of the present disclosure illustrating a configuration (e.g. "embodiment" illustrated in FIG. 6) for a memory stack for repeating inter-die signals within a multi-die package according to embodiments of the present disclosure. Notably, the first embodiment illustrated in FIG. 6 is not limited to the precise configuration as shown, and, instead, may be modified in any appropriate manner as needed or required for a specific use-case scenario.

The existing configuration of a memory stack 58 is illustrated on the left side of FIG. 6. In certain embodiments, the memory stack 58 may include any of the componentry as described for the memory device 10 and may be contained within a single package of the memory device 10. As illustrated, the memory stack 58 may include a primary memory die 60 and one or more secondary memory dies 62 (in FIG. 6 three secondary memory dies 62 are shown for a total stack height of 4H including the primary memory die 60, however, any number may be included in the memory stack 58). In certain embodiments, the primary memory die 60 may include a primary memory die transmitter 602, a primary memory die receiver 604, a primary memory die ESD component 606, among other componentry. In certain embodiments, the primary memory die transmitter 602 may be utilized to transmit inter-die signals and/or other signals via lines of the primary memory die 60. In certain embodiments, the primary memory die receiver 604 may be utilized to receive inter-die signals and/or other signals via lines of the primary memory die 60. In certain embodiments, the primary memory die ESD component 606 may include componentry to reduce or prevent potential damage from electrostatic discharges that may occur within the primary memory die 60.

In certain embodiments, inter-die signals may be generated by the primary memory die 60 in response to receipt of a signal and/or request provided by a host device and/or system. For example, the request from the host device may be to access data stored in the memory stack 58, write data to the memory stack 58, modify data in the memory stack 58, delete data from the memory stack 58, replace data from the memory stack 58, and/or perform any other operations that may utilized the features and/or functionality of the memory stack 58. The inter-die signals may reach the primary memory die receiver 604 and the primary die ESD component 606 via lines connected to a wirebond pad 608 (or TSV or other structure). The inter-die signals may be transmitted from the primary memory die 60 to the first secondary memory die 62 in the memory stack 58, such as by an inter-die connection facilitated by the wirebond pad 608 and the wirebond pad 628 of the first secondary memory die 62.

Once the inter-die signals are received by the first secondary memory die 62, the inter-die signals will be propagated to each of the components of the first secondary memory die 62. The components of the secondary memory die 62 may include a first secondary memory die transmitter 622, a first secondary memory die receiver 614, and a first secondary memory die ESD component 616. The inter-die signals may then be propagated to each subsequent secondary memory die 62 in the memory stack 58. In FIG. 6, the inter-die signals may be propagated to the second secondary memory die 62 and also to the third secondary memory die 62 via inter-die connections facilitated by corresponding wirebond pads 628. The inter-die signals will also be propagated to all of the components of the second secondary memory die 62 and the third secondary memory die 62, which include their own corresponding transmitters, receivers, and ESD componentry. As a result, since the inter-die signals touch the transmitters, receivers, and ESD componentry of each die in the memory stack 58, the signal load on the memory stack 58 may be significant. Indeed, as the memory stack 58 height increases from 4H (as shown in FIG. 6) to greater heights, such as 8H or 16H, the load on the inter-die signals increases even further, which leads to propagation delays relating to signaling, increased power consumption, increased inter-die connection delays, among other detrimental effects.

In the above-described scenario, inter-die command and address lines are one-directional/unidirectional. Signals associated with such lines are transmitted from the primary memory die 60 and are received by each secondary memory die 62 within the stacked memory 58. While the primary memory die transmitter 602 of the primary memory die 60 is always active, the transmitters 622 of each of the secondary memory dies 62 may be unused and/or are disabled. Additionally, utilizing ESDs 606, 616 on each of the die within the memory stack 58 may be unnecessary and may only serve to increase the signal load within the memory stack 58.

Referring now also to the first embodiment in FIG. 6 (i.e., pictured on the right side of FIG. 6 as an exemplary 4H memory stack 58 with one primary die 60 (i.e., die0) and three secondary dies 62 (die1, die2, and die 3)), for unidirectional lines (e.g., unidirectional command and address line and/or data write signals that are sent from the primary memory die 60 to each secondary memory die 62 in one direction), the present disclosure includes inserting a multiplexer 630 before the primary memory die transmitter 602 (first die shown as die0) such that the output of the multiplexer 630 serves as an input to the primary memory die transmitter 602. Similarly, multiplexors 630 may be inserted before the secondary memory die transmitters 622 of the secondary memory dies 62. For a command and address line and/or data write signal that is sent from the primary memory die 60 internally within the memory stack 58, the multiplexer 630 may point to the internal signal (e.g., signal 650 serving as an input to the multiplexer 630). A selector line(s) of the multiplexer 630 may be utilized to control which input of the multiplexer 630 is provided as the output to the primary memory die transmitter 602 of the primary die 60. The signal may be provided to the primary memory die transmitter 602, which may transmit the signal to the next die in the memory stack 58, which is die1. The signal (e.g., signal 652, which may be the same as signal 650) may then be provided as an input to the multiplexer 630 of the next die in the memory stack, which is die2. The multiplexer 630 of die2 may be utilized to facilitate generation of a repeated inter-die signal so that the signal may be repeated throughout the remainder of the memory stack 58, such as to the ultimate destination die3 of the memory stack 58. In the foregoing example, the multiplexer 630 and transmitters on die0 and die2 may be active. Die0 (i.e. the primary die 60) may be configured to drive the inter-die signal halfway up the path in the memory stack 58 and die2 may be configured to repeat the inter-die signal so that the inter-die signal may be driven up a remaining portion of the path up the memory stack 58. The primary die may have wirebond pads/connection points 636, 638 and the secondary die may have wirebond pads/connection points 646 to facilitate connections between the dies and the components of the dies. The signal repetition technique may be repeated as necessary as heights of the memory stack 58 are varied and each die within the stack 58 may be configured to incorporate die-level detect signals that may be utilized to control the corresponding multiplexers 630 and/or transmitters 602, 622 of each die 60, 62.

Figure 7:
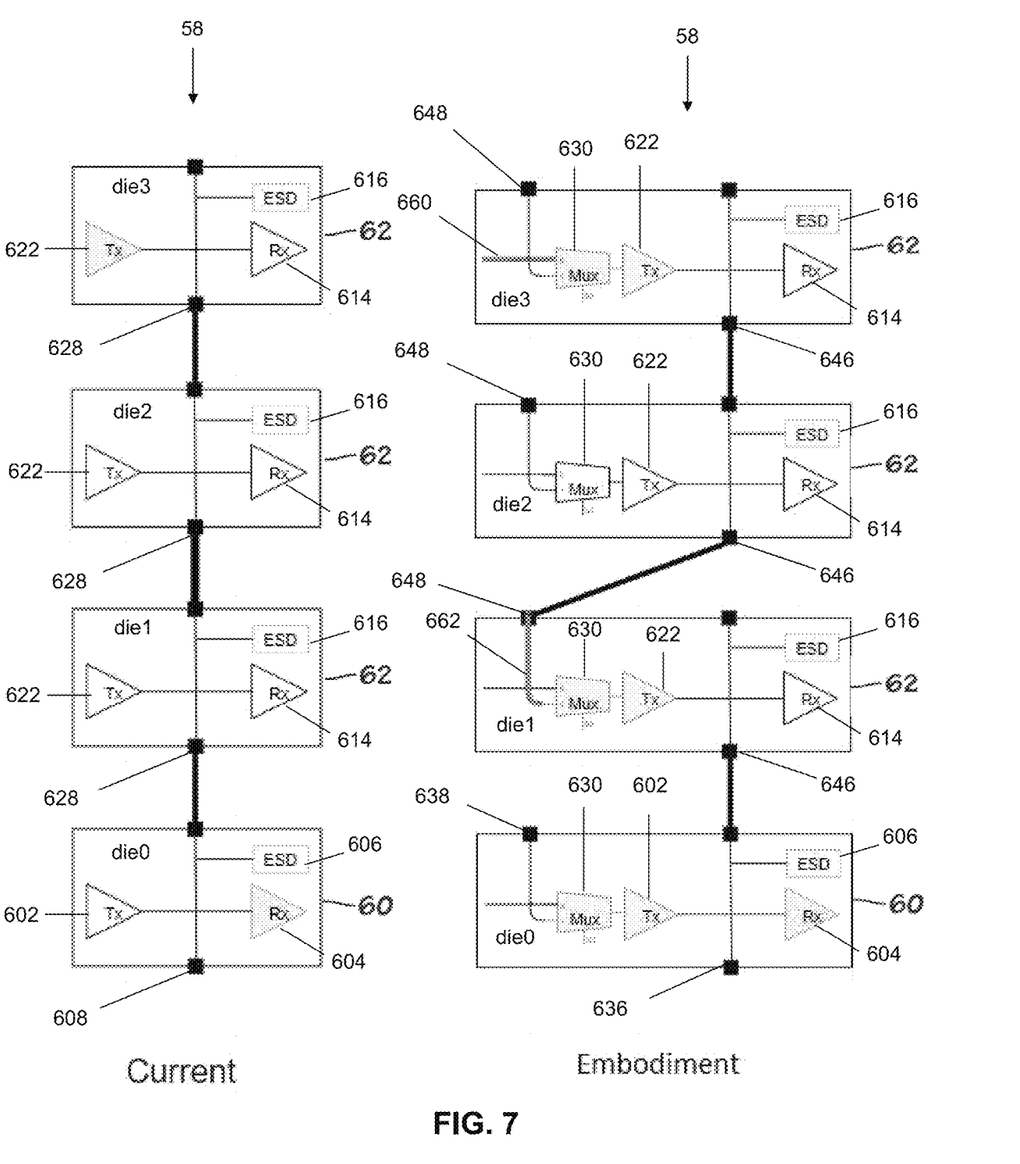
FIG. 7 illustrates a pair of schematic diagrams illustrating a current configuration of a memory stack for use with a multi-die package and a configuration for a memory stack for facilitating repetition of inter die signals within a multi-die package that are intended to be received by a primary memory die according to embodiments of the present disclosure.

Referring now also to FIG. 7, FIG. 7 illustrates schematic diagrams illustrating an existing configuration of a memory stack (e.g., memory stack 58) for use with a multi-die package and a second embodiment of the present disclosure illustrating a configuration (e.g., "embodiment" illustrated in FIG. 7) for a memory stack for repeating inter-die signals (e.g., signals associated with data read signals and associated lines) within a multi-die package according to embodiments of the present disclosure. Notably, the second embodiment illustrated in FIG. 7 is not limited to the precise configuration as shown, and, instead, may be modified in any appropriate manner as needed or required for a specific use-case scenario. On the left side of FIG. 7, for the existing configuration for example, a data read signal traversing a data read line may be sent using the transmitter 622 of die3 and the signal may be transmitted through each of die2 and die 1 and ultimately received by primary die, die0, via its corresponding primary die receiver 604. In the second embodiment, shown on the right side of FIG. 7, however, inter-die signal repetition is facilitated. The inter-die signal (e.g., signal 660), which may be a data read signal, may serve as an input to the multiplexer 630 of die3. A selector line of the multiplexer 630 may be utilized to select which input to the multiplexer 630 is provided as the output into the transmitter 622 of die3. The inter-die signal may then be provided to die2 and then provided as an input to the multiplexer 630 of die1 (e.g., signal 662, which may be the same as signal 660). The output of the multiplexer 630 of die1 may serve as an input to the transmitter 622 of die1 and the inter-die signal may be repeated and provided to the ultimate destination die0, such as via its receiver 604. The signal repetition technique may be repeated as necessary as heights of the memory stack 58 are varied and each die within the stack 58 may be configured to incorporate die-level detect signals that may be utilized to control the corresponding multiplexers 630 and/or transmitters 602, 622 of each die 60, 62. In certain embodiments, control signals may be driven by the dies above die1 (e.g., die2 and die3 in this example), which may then be utilized by die1 to control the corresponding multiplexers and/or transmitters when a data read is occurring from die2 and/or die3.

Figure 8:
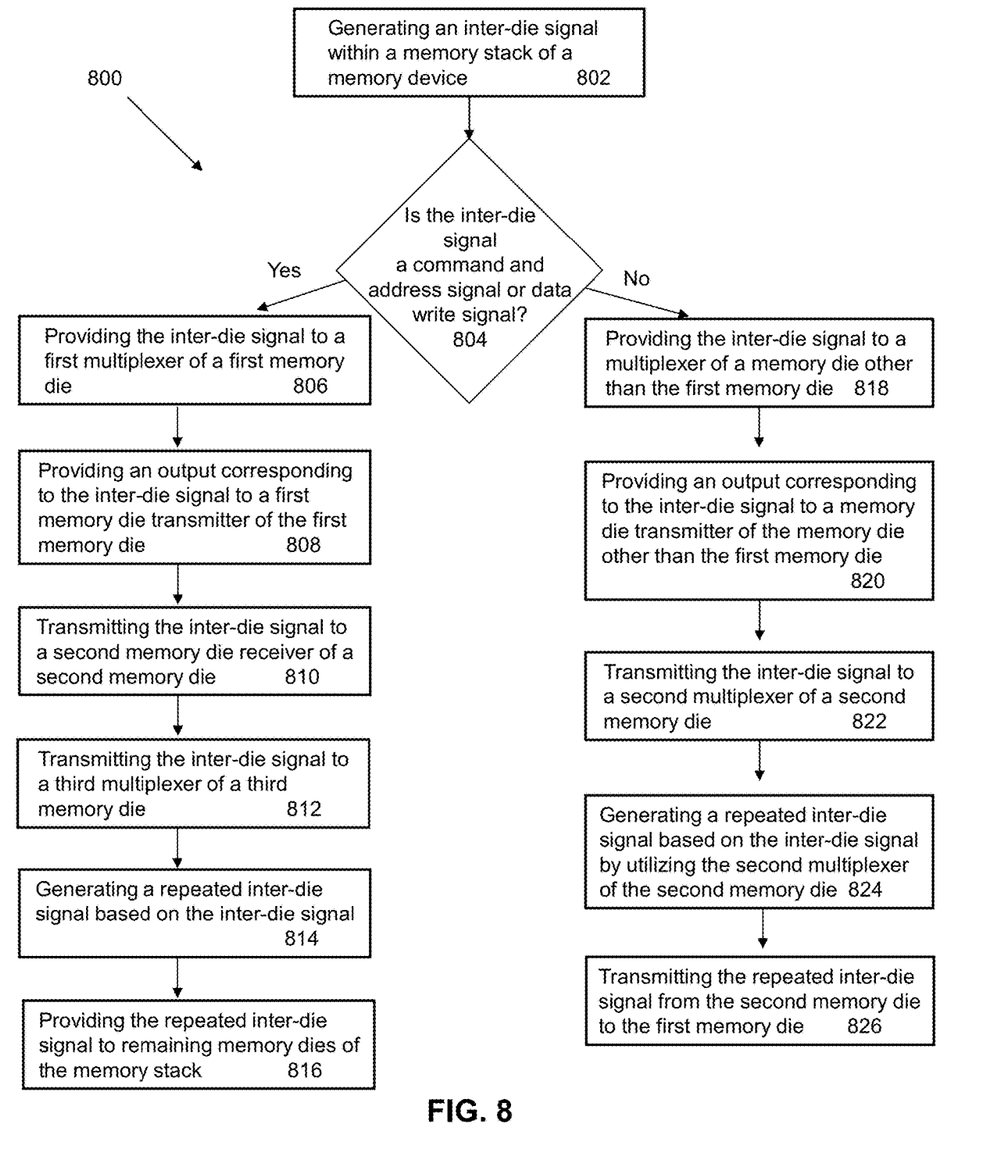
FIG. 8 illustrates a flow chart of a method for repeating inter-die signals within a multi-die package of a memory device according to an embodiment of the present disclosure.

An exemplary method 800, shown in FIG. 8, for facilitating repetition of inter-die signals within a memory device 10 including a multi-die package is provided herewith. Notably, the method 800 may include any of the features and/or functionality otherwise described in the present disclosure and is not intended to be limited to the specific steps illustrated in FIG. 8. At step 802 of the method 800, the method 800 may include generating an inter-die signal within a memory stack (e.g., memory stack 58) of a multi-die package of a memory device 10. In certain embodiments, the inter-die signal may be generated by a primary memory die 60 or by one or more secondary memory dies 62 of the memory stack of the memory device 10. At step 804, the method 800 may include determining whether the inter-die signal is a command and address signal, a data write signal, a data read signal, or any other type of signal. If the determination indicates that the inter-die signal is a command and address signal or a data write signal (or other unidirectional signal originating from the primary memory die 60 and intended for one or more secondary memory dies 62 of the memory stack 58), the method 800 may proceed to step 806. At step 806, the method 800 may include providing the signal (e.g., internal signal 650) to a first multiplexer (e.g., multiplexer 630) of a first memory die (e.g., die0 corresponding to primary memory die 60) of the memory stack 58. In certain embodiments, each die in the memory stack may have die-level detect signals that may be utilized to control corresponding multiplexers and/or transmitters within each die. At step 808, the method 800 may include providing an output corresponding to the signal to a first memory die transmitter (e.g., memory die transmitter 622 of die0) of the first memory die.

At step 810, the method 800 may include transmitting the inter-die signal to a second memory die receiver (e.g., secondary memory die receiver 614 shown in die1 on the right side of FIG. 6) of a second memory die (e.g., die1 corresponding to secondary memory die 62 in FIG. 6). At step 812, the method 800 may include transmitting the inter-die signal (e.g., signal 652, which may be the same as signal 650) to a third multiplexer (e.g., multiplexer 630 of die2) of a third memory die (e.g., die2 in FIG. 6). For example, the inter-die signal may be transmitted from the second memory die to the third multiplexer of the third memory die. At step 814, the method 800 may include generating a repeated inter-die signal based on the inter-die signal (or facilitating repetition of the inter-die signal). For example, the inter-die signal may be provided as an input to the third multiplexer to facilitate generation of the repeated inter-die signal, which may serve as an input to the third memory die transmitter (e.g., transmitter 622 of die2). At step 816, the method 800 may include providing the repeated inter-die signal to remaining memory dies of the memory stack 58. For example, in FIG. 6, the repeated inter-die signal may be transmitted by utilizing the third memory die transmitter 622 to the fourth memory die (e.g., die3 of FIG. 6). If there are multiple other dies in the memory stack 58, the inter-die signal may be repeated as often as necessary within the memory stack 58 by utilizing the multiplexers to ensure delivery of the inter-die signal to the intended destination and/or enhance performance of the memory device 10.

If, however, at step 804, the method 800 includes determining that the inter-die signal is a signal other than a command and address signal or data write signal (e.g., such as a data read signal or other signal), the method 800 may proceed to step 818. At step 818, the method 800 may include providing the inter-die signal (e.g., input signal 660) as an input to a multiplexer of a memory die other than the first memory die of the stack 58. For example, referring to FIG. 7, the memory die other than the first memory die may be a secondary memory die, such as die3, shown in the right side of FIG. 7, and the multiplexer may be multiplexer 630 of die3. At step 820, the method 800 may include providing an output corresponding to the inter-die signal to a memory die transmitter of the memory die other than the first memory die. For example, in FIG. 7, the inter-die signal may be provided to secondary memory die 622 of die3. At step 822, the method 800 may include transmitting the inter-die signal to the next memory die in the memory stack 58 (e.g., die2 in FIG. 7) and then transmitting the inter-die signal to a multiplexer of a further memory die in the memory stack 58 (e.g., multiplexer 630 of die1 in FIG. 7). When transmitting the inter-die signal to the multiplexer of the further memory die in the memory stack 58, the signal may serve as an input (e.g. input signal 662 which may be the same as signal 660) to the multiplexer. At step 824, the inter-die signal may be repeated, such as by utilizing the multiplexer of the further memory die. At step 826, the method 800 may include transmitting the repeated inter-die signal from the further memory die to the first memory die (e.g., die 1 may transmit the repeated inter-die signal to die0) as the final intended recipient of the signal. If there are multiple other dies in the memory stack 58, the inter-die signal may be repeated as often as necessary within the memory stack 58 by utilizing the multiplexers to ensure delivery of the inter-die signal to the intended destination and/or enhance performance of the memory device 10. Notably, the method 800 may incorporate any of the other functionality and features described herein.

The disclosure includes various devices which perform the methods and implement the systems described above, including data processing systems which perform the methods, and computer-readable media containing instructions, which when executed on data processing systems, cause the systems to perform the methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the computer-readable medium used to affect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
a host; and
a memory device comprising:
a plurality of memory dies, comprising:
a first memory die configured to handle interfacing for the memory device with the host;
a second memory die coupled to and configured to communicate with the first memory die via a first inter-die connection, wherein the second memory die comprises a second multiplexer, a second memory die transmitter, and a second memory die receiver;
a third memory die coupled to and configured to communicate with the second memory die via a second inter-die connection, wherein the third memory die comprises a third multiplexer and a third memory die transmitter;
wherein:
for a first signal driven by the first memory die via a unidirectional line of the memory device, the first signal is provided to a first multiplexer of the first memory die and an output of the first multiplexer is provided as an input to a first memory die transmitter, wherein the first signal is transmitted by the first memory die transmitter and received by the second memory die receiver, wherein the first signal is provided by the second memory die to the third multiplexer of the third memory die to facilitate repetition of the first signal to remaining memory dies of the plurality of memory dies.

2. The system of claim 1, wherein the plurality of memory dies of the memory device are stacked on top of one another to form a memory stack of the memory device.

3. The system of claim 1, wherein the first memory die comprises a primary memory die and the second memory die, the third memory die, and the remaining memory dies comprise secondary memory dies, and wherein the secondary memory dies only communicate within the memory device.

4. The system of claim 1, wherein: for a second signal driven by a fourth memory die of the plurality of memory dies other than the first memory die and intended to be received by the first memory die, the second signal is provided to a multiplexer of the fourth memory die and an output of the multiplexer is provided as an input to a transmitter of the fourth memory die, wherein the second signal is transmitted by the fourth memory die internally within the memory device and is repeated by utilizing a fourth multiplexer of the memory device prior to receipt by the first memory die.

5. The system of claim 1, wherein a control signal of the memory device is utilized to select the output of the first multiplexer that is provided as the input to the first memory die transmitter.

6. The system of claim 1, wherein for the first signal, the first memory die drives a first portion of a path of the first signal within the memory device and the third memory die drives a second portion of the path of the first signal within the memory device.

7. The system of claim 1, wherein the first signal, a second signal, or a combination thereof, are inter-die signals transmitted within the memory device.

8. The system of claim 1, wherein the first memory die, the second memory die, the third memory die, or a combination thereof, has a die-level detect signal utilized to control the first multiplexer, the first memory die transmitter, the second multiplexer, the second memory die transmitter, the third multiplexer, the third memory die transmitter, or a combination thereof.

9. The system of claim 1, wherein the first multiplexer is positioned in front of the first memory die transmitter on the first memory die, wherein the second multiplexer is positioned in front of the second memory die transmitter on the second memory die, and wherein the third multiplexer is positioned in front of the third memory die transmitter on the third memory die, or a combination thereof.

10. The system of claim 1, wherein the first signal comprises a command and address signal or a data write signal.

11. The system of claim 4, wherein the second signal comprises a data read signal associated with reading data from at least one die of the plurality of memory dies of the memory device.

12. The system of claim 1, further comprising a fourth memory die of the plurality of memory dies coupled to and configured to communicate with the third memory die via a third inter-die connection, wherein the fourth memory die comprises a fourth multiplexer having an output serving as an input to a fourth memory die transmitter of the fourth memory die.

13. The system of claim 12, wherein a fourth memory die receiver of the fourth memory die is configured to receive a repeated first signal generated based on the first signal and by utilizing the third multiplexer of the third memory die.

14. The system of claim 1, wherein one or more of the plurality of memory dies comprises an electrostatic discharge component configured to reduce or prevent damage associated with electrostatic discharge occurring within the memory device.

15. The system of claim 1, wherein a first memory die receiver of the first memory die is configured to receive a repeated second signal generated based on a second signal and by utilizing a fourth multiplexer of the memory device.

16. The system of claim 1, wherein, for a second signal, a control signal is driven by a fourth memory die other than the first memory die and is utilized by the second memory die to control the second multiplexer and the second memory die transmitter when a read is occurring from the fourth memory die other than the first memory die.

17. A method, comprising:
   generating a first inter-die signal at a first memory die of a plurality of memory dies of a memory device;
   providing the first inter-die signal to a first multiplexer of the first memory die;
   providing an output corresponding to the first inter-die signal to a first memory die transmitter of the first memory die;
   transmitting the first inter-die signal to a second memory die receiver of a second memory die of the plurality of memory dies, wherein the second memory die comprises a second multiplexer;
   transmitting the first inter-die signal from the second memory die to a third multiplexer of a third memory die of the plurality of memory dies;
   generating, by utilizing the third multiplexer, a repeated first inter-die signal based on the first inter-die signal; and
   providing the repeated first inter-die signal to remaining memory dies of the plurality of memory dies of the memory device.

18. The method of claim 17, further comprising generating the first inter-die signal in response to receiving a signal from a host, an outside system, or a combination thereof.

19. The method of claim 17, further comprising repeating the first inter-die signal based on a memory stack height of a memory stack formed based on the plurality of memory dies.

20. The method of claim 17, further comprising generating a second inter-die signal at a memory die other than the first memory die and intended to be transmitted to the first memory die.

21. The method of claim 20, further comprising providing the second inter-die signal to a multiplexer of the memory die other than the first memory die, and further comprising providing an output corresponding to the second inter-die signal to a memory die transmitter of the memory die other than the first memory die.

22. The method of claim 21, further comprising transmitting the second inter-die signal to the second multiplexer of the second memory die, and further comprising generating a repeated second inter-die signal based on the second inter-die signal and by utilizing the second multiplexer of the second memory die.

23. The method of claim 22, further comprising transmitting the repeated second inter-die signal from the second memory die to first memory die.

24. A device, comprising:
   a memory device comprising a plurality of memory dies, the plurality of memory dies comprising:
      a first memory die configured to handle interfacing for the memory device with a host;
      a second memory die coupled to and configured to communicate with the first memory die via a first inter-die connection, wherein the second memory die comprises a second multiplexer, to a second memory die transmitter, and a second memory die receiver;
      a third memory die coupled to and configured to communicate with the second memory die via a second inter-die connection, wherein the third memory die comprises a third multiplexer;
   wherein:
      for a signal driven by the first memory die, the signal is provided to a first multiplexer of the first memory die and an output of the first multiplexer is provided as an input to the first memory die transmitter, wherein the first signal is transmitted by the first memory die transmitter and received by the second memory die receiver, wherein the signal is provided by the second memory die to the third multiplexer of the third memory die to facilitate repetition of the signal to remaining memory dies of the plurality of memory dies of the memory device.

* * * * *